United States Patent Office 2,932,640
Patented Apr. 12, 1960

2,932,640

17α,21-OXIDES OF 4-PREGNENE COMPOUNDS AND PROCESS FOR PREPARING THE SAME

George A. Bailey, Roselle, and Ralph F. Hirschmann, Westfield, N.J., assignors to Merck & Co., Inc., Rahway, N.J., a corporation of New Jersey No Drawing. Application September 20, 1956
Serial No. 610,889

6 Claims. (Cl. 260—239.55)

This invention relates to steroids and particularly to novel compounds having cortisone-like activity.

According to the present invention, there are produced a group of novel 17α,21-oxides of pregnene compounds having cortisone-like anti-inflammatory activity. These compounds are 9α-fluoro-11β-hydroxy-3,20-diketo-4-pregnene-17α,21-oxide, 9α-fluoro-3,11,20-triketo-4-pregnene-17α,21-oxide, 9α-fluoro-11β-hydroxy-3,20-diketo-1,4-pregnadiene-17α,21-oxide, and 9α-fluoro-3,11,20-triketo-1,4-pregnadiene-17α,21-oxide. These compounds may be represented by the following structural formulas:

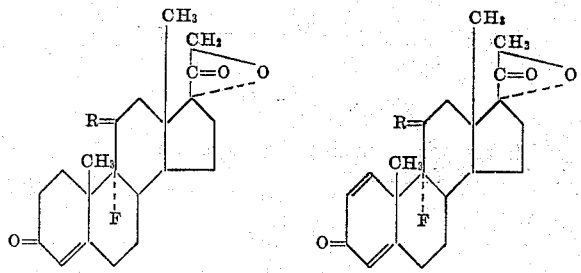

where R is selected from the group consisting of keto (O=) and hydroxyl

The therapeutic activity of the 17α,21-oxides according to this invention is surprising in view of the fact that compounds 11β-hydroxy-3,20-diketo-4-pregnene-17α,21-oxide (hydrocortisone oxide) and 3,11,20-triketo-4-pregnene-17α,21-oxide (cortisone oxide) possess so little cortisone-like activity as to be useless for this purpose. A highly desirable property of the compounds of this invention is that they may be administered in effective doses without causing objectionable increase in secretion of gastric acids in the patient.

The compounds according to the present invention can be prepared by reaction of the corresponding 21-halo compounds, where the 21-halo atom has an atomic weight of at least 35 (that is, either chlorine, bromine, or iodine) with a silver salt, silver oxide or silver hydroxide in a suitable liquid medium. An organic liquid medium such as acetonitrile, tetrahydrofuran, or diethyl ether is preferred. The reaction may be represented by the following equation:

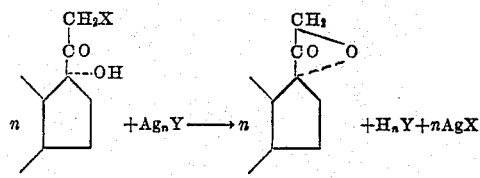

In the above equation, X represents either chlorine, bromine, or iodine, and Y represents a cationic element or radical having a valence $n$. The 21-iodo steroid compounds are preferred, although the 21-chloro- and 21-bromo-compounds are also suitable reagents. Only the D ring has been shown in the above equation as the substituents on the A, B, and C rings remain unchanged and do not affect the course of the reaction.

Various silver salts may be used in preparing the 17α,21-oxides of this invention. Among these are silver phosphate, silver sulfate, and silver carbonate. Silver oxide and silver hydroxide may also be used. Silver phosphate may be mixed with phosphoric acid in carrying out the reaction with the 21-iodo-pregnene compound.

This invention will now be described by reference to the following examples.

Example 1

A mixture of 900 g. of trisilver phosphate and 371 ml. of 85% phosphoric acid is prepared, and 2.8 liters of acetonitrile are added. Then 280 g. of 9α-fluoro-21-iodo-11β,17α-dihydroxy-3,20-diketo-4-pregnene are added, and the mixture is refluxed for 1¼ hours. The mixture is then allowed to cool over a period of one hour and is stirred during this period. Then 2.8 liters of ice water are added and the acetonitrile is removed in vacuo at a temperature below 25° C. The pH is then adjusted to 6.8 by the addition of about 1.4 liters of cold 30% aqueous sodium hydroxide. The mixture is then cooled to a temperature in the range of 0° to 10° C. and held at that temperature for about 16 hours. The water-insoluble material is removed by filtration and then washed with water until no ultra-violet absorbing material is detected in the wash water. The filter cake is then slurried in about 11 liters of acetone and the slurry is filtered to separate the acetone-insoluble substances. The filter cake is washed with acetone and then the combined filtrate and washes are treated with 25 g. of decolorizing charcoal. After separation of the charcoal from the filtrate, the latter is concentrated by evaporation. Water is then added and the remainder of the acetone is then distilled off. The compound which is recovered is 9α-fluoro-11β-hydroxy-3,20-diketo-4-pregnene-17α,21-oxide. A portion of the product is recrystallized from an acetone-n-hexane mixture to afford the pure oxide. The pure oxide decomposes at 236° C.; $[\alpha]_D$ +192° (in dimethyl acetamide);

$$\lambda_{max.}^{MeOH} \ 237 \ m\mu$$

E=16,900; $\lambda_{max.}$ 3.0μ, 5.5μ, 6.07μ (shoulder), 6.17μ (in a hydrocarbon oil). Analysis: Found, C, 69.18%; H, 7.47%.

Example 2

An equivalent quantity of 9α-fluoro-21-iodo-17α-hydroxy-3,11,20-triketo-4-pregnene is reacted with a silver phosphate-phosphoric acid mixture as described in Example 1. The product recovered is 9α-fluoro-3,11,20-triketo-4-pregnene-17α,21-oxide.

Example 3

Equivalent quantities of 9α-fluoro-21-iodo-11β,17α-dihydroxy-3,20-diketo-1,4-pregnadiene and a silver phosphate-phosphoric acid mixture are reacted according to the process of Example 1. The compound 9α-fluoro-11β-hydroxy-3,20-diketo-1,4-pregnadiene-17α,21-oxide is recovered.

Example 4

The compound 9α-fluoro-21-iodo-17α-hydroxy-3,11,20-triketo-1,4-pregnadiene is reacted with a silver phosphate-phosphoric acid mixture as described in Example 1. The compound 9α-fluoro-3,11,20-triketo-1,4-pregnadiene-17α,21-oxide is recovered.

Example 5

A mixture of 2.0 g. of 9α-fluoro-21-iodo-11β,17α-dihydroxy-3,20-diketo-4-pregnene and 5.0 g. of freshly prepared silver carbonate which has been dried at 50° C. is suspended in 45 ml. of acetonitrile and refluxed with stirring in a nitrogen atmosphere for 2¼ hours. The mixture is filtered and the precipitate washed with acetonitrile. The combined filtrate and washings are concentrated to a volume of about 20 ml., and crude 9α-fluoro-11β-hydroxy-3,20-diketo-4-pregnene-17α,21-oxide precipitates. About 0.68 g. of the crude oxide is dissolved in 10 ml. of chloroform, adsorbed on 20 g. of alkaline alumina, and eluted with 40 ml. of chloroform. The chloroform is removed by evaporation, and the oxide residue is recrystallized twice from acetone to produce substantially pure 9α-fluoro-11β-hydroxy-3,20-diketo-4-pregnene-17α,21-oxide.

While the foregoing invention has been described with reference to specific details and embodiments thereof, it is understood that the scope of this invention is measured only by the scope of the appended claims.

What is claimed is:

1. 9α-fluoro-11β-hydroxy-3,20-diketo-4-pregnene-17α,21-oxide.
2. 9α-fluoro-3,11,20-triketo-4-pregnene-17α,21-oxide.
3. 9α-fluoro-11β-hydroxy-3,20-diketo-1,4-pregnadiene-17α,21-oxide.
4. 9α-fluoro-3,11,20-triketo-1,4-pregnadiene-17α,21-oxide.
5. A compound having a formula of the group consisting of

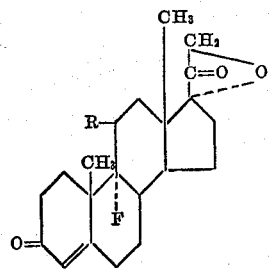

and

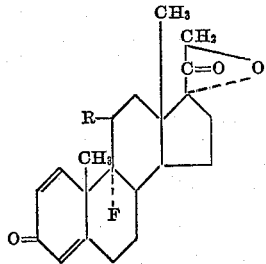

where R is selected from the group consisting of

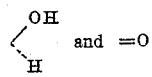

6. A process for preparing a compound having a formula of the group consisting of

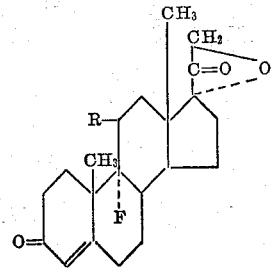

and

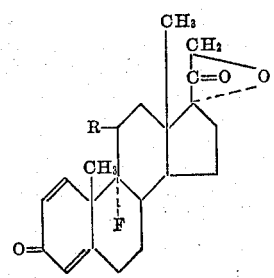

where R is selected from the group consisting of

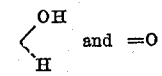

which comprises reacting the corresponding compound having the formula

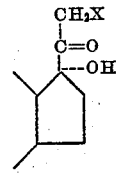

where X is a halogen having an atomic weight of at least 35, with a compound selected from the group consisting of silver phosphate, silver sulfate, silver carbonate, silver oxide, and silver hydroxide in an organic liquid medium, and recovering the pregnene-17α,21-oxide compound from the reaction mixture.

References Cited in the file of this patent

UNITED STATES PATENTS

| | | |
|---|---|---|
| 2,836,595 | Beyler et al. | May 27, 1958 |
| 2,865,915 | Bailey et al. | Dec. 23, 1958 |